United States Patent Office 3,704,300
Patented Nov. 28, 1972

3,704,300
IMIDAZO(2,1-a)PHTHALAZINES
Goetz E. Hardtmann, Florham Park, N.J., assignor to Sandoz-Wander, Inc., Hanover, N.J.
No Drawing. Continuation-in-part of application Ser. No. 785,765, Dec. 20, 1968. This application Apr. 9, 1971, Ser. No. 132,869
Int. Cl. C07d 51/06
U.S. Cl. 260—250 A                        14 Claims

ABSTRACT OF THE DISCLOSURE

This invention discloses novel compounds which are imidazo(2,1-a)phthalazines and methods of preparation, said imidazo(2,1-a)phthalazines being useful by reason of exhibiting pharmacological activity in animals, e.g., as hypotensives.

---

This application is a continuation-in-part of copending application Ser. No. 785,765, filed Dec. 20, 1968 now abandoned.

The present invention relates to novel tricyclic compounds, and more particularly to compounds which are imidazo(2,1-a)phthalazines, and to methods for preparation of said compounds. The invention also relates to pharmaceutical compositions and methods employing said compounds.

The compounds of the invention may be represented by the following Formula I:

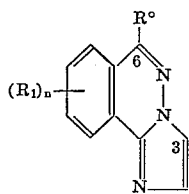

(I)

wherein

R° represents hydrogen, OR or

and

R represents lower alkyl of 1 to 6 carbon atoms; allyl; methylallyl, e.g., methallyl; propargyl; di(lower of 1 to 3 carbon atoms) alkylamino(lower of 1 to 4 carbon atoms) alkyl, e.g. dimethylaminopropyl; phenyl or phenyl substituted in the nucleus by 1 to 2 halogen atoms of atomic weight of from 19 to 80;
R' represents hydrogen, and
R" represents hydrogen; amino; lower alkyl or 1 to 5 carbon atoms; allyl; methallyl; propargyl; di(lower of 1 to 3 carbon atoms)alkylamino(lower of 1 to 4 carbon atoms) alkyl, e.g., dimethylaminoethyl; cycloalkyl of 3 to 6 carbon atoms, e.g. cyclopropyl; lower hydroxyalkyl of 2 to 6 carbon atoms; or phenalkyl wherein the alkyl is of 1 to 4 carbon atoms and the phenyl is unsubstituted or substituted by 1 to 2 halogen atoms of atomic weight of from 19 to 80, e.g., phenethyl; or
R' and R" together with the nitrogen attached to the ring represent di(lower of 1 to 5 carbon atoms) alkylamino; diallylamino; di(methylallyl)amino; or dipropargylamino; or
R' and R" together with the nitrogen attached to the tricyclic ring system form a 5 to 6 membered saturated heterocyclic group represented by:

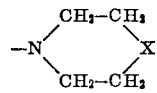

wherein

X is (a) a direct bond, (b) methylene, (c) oxygen or (d) N—R$_x$ wherein R$_x$ is hydrogen or lower alkyl of 1 to 3 carbon atoms, e.g., 4-methylpiperazinyl,
R$_1$ represents halo of atomic weight of from 19 to 80, lower alkyl of 1 to 5 carbon atoms or lower alkoxy of 1 to 5 carbon atoms, and
n is 0, 1 or 2, and when 2, then R$_1$ may be the same or different.

The compounds of Formula I in which R° is N'R" are preferably prepared by a Procedure A involving reacting a 6-haloimidazo(2,1-a)phthalazine of Formula II:

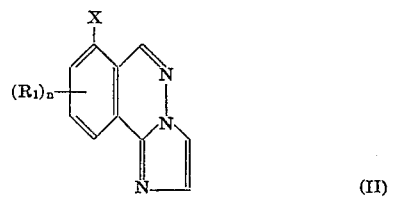

(II)

wherein R$_1$ and n are as above defined, and X is bromo or chloro, with an amine of Formula III:

$$HNR'R'' \qquad (III)$$

wherein R' and R" are as above defined, in a solvent medium.

The compounds of Formula I in which R° is OR are preferably prepared by a Procedure B involving the reaction of a 6-haloimidazo(2,1-a) phthalazine of Formula II with a metal salt of Formula IV:

$$MOR \qquad (IV)$$

wherein R is as above-defined and M is a metal cation, preferably an alkali metal cation, e.g., sodium, in a solvent medium.

The compounds of Formula I in which R° is hydrogen are preferably prepared by a Procedure C involving subjecting a 3-alkoxy-2,3-dihydroimidazo(2,1-a)phthalazine of Formula V:

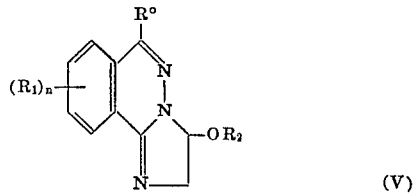

(V)

wherein R$_1$ and n are above-defined, R° is hydrogen and R$_2$ is lower alkyl of 1 to 5 carbon atoms, preferably 1 to 2 carbon atoms, to an elimination reaction in which said compound V is reacted with a strong acid in an organic solvent.

The preparation of compounds I by Procedure A involving reaction of a compound II with a compound III may be conveniently carried out in a solvent medium at temperatures in the range of 10° C. to 200° C. In many forms of practice it is convenient to employ an excess of the compound III as solvent for the reaction. Various of the several well known conventional organic solvents may also be employed. Examples of the more suitable conventional solvents include chloroform, methylene chloride, benzene, toluene, dioxane and dimethylacetamide. The use of elevated temperatures may beneficially influence reaction rates although the preferred reaction temperatures may depend upon the choice of the reaction solvent. Compounds I may be isolated from the reaction of Procedure A by working up in a known manner.

The production of compounds I by Procedure B involving reaction of a compound II with a compound IV may be suitably carried out at temperatures in the range of 10° C. to 100° C., preferably 15° C. to 60° C. The reaction is conveniently carried out in an organic solvent which is nonhydroxylic and otherwise inert under the reaction conditions. Solvents which are of the conventional and well-known types are representative of the solvents which may be most conveniently employed. The suitable inert solvents include by definition herein the lower alcohols which represent the corresponding alcohol analogues of R in the compound of Formula IV employed in the reaction. the lower alcohols represent the solvents preferably employed when R is a non-aromatic hydrocarbon radical. In such situations the alcohol is the corresponding analogue of R and thus useful in forming the compound IV, e.g. allyl alcohol when R is allyl. When R is aromatic, the more preferred solvents include dimethylacetamide, dimethylformamide and the like, more usually dimethylacetamide. The reaction products of Formula I may be obtained from the reaction by working up by established procedures.

The preparation of compounds I by the elimination reaction of Procedure C is preferably carried out in an inert organic solvent at elevated temperatures which may be suitably in the range of 40° C. to 200° C., more usually 60° C. to 150° C. Representative of the more preferred inert organic solvents are the aromatic solvents such as toluene, benzene and xylene, more usually toluene. Desirably, the compound V is subjected in Procedure C to the reaction of a strong acid which may be either an inorganic acid such as sulfuric acid or an organic acid such as p-toluene-sulfonic acid, benzenesulfonic acid or methane-sulfonic acid. In general, an organic acid such as p-toluene-sulfonic acid is preferred because of the better solubility in the reaction mixture. The reaction products of Formula I may be isolated from the reaction mixture of Procedure C by working up by established procedures.

Compounds II and V employed as starting material in Procedures A and B, and C, respectively, are novel compounds which are preferably prepared by a sequence of reactions commencing by subjecting in a Step 1 a known type compound which is 1-halophthalazine of Formula VI:

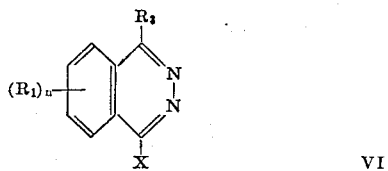

VI wherein $R_1$, $n$ and X are as above-defined, and $R_3$ is X as above-defined or hydrogen depending respectively on whether a compound II or V is desired, to reaction with a compound of Formula VII:

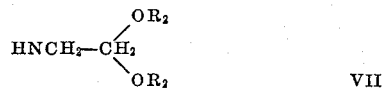

VII wherein $R_2$ is as above-defined, to obtain an aminoacetaldehyde dialkyl acetal of Formula VIII:

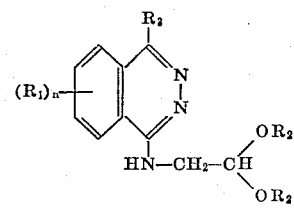

VIII wherein $R_1$, $n$, $R_2$ and $R_3$ are as above-defined, said compound VIII then being cyclized in a Step 2 by heating with an acid to obtain a 3-alkoxy-2,3-dihydroimidazo (2,1-a)phthalazine of Formula IX:

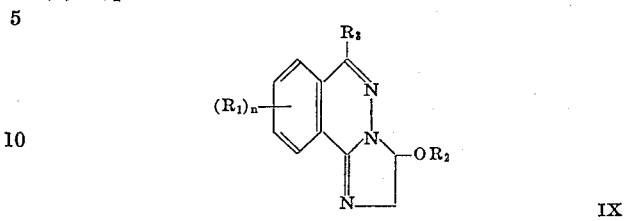

IX wherein $R_1$, $n$, $R_2$ and $R_3$ are as above-defined. When $R_3$ is hydrogen the compound IX is compound V and is used as starting material in Procedure C. When $R_3$ is halo then compound IX may be converted to a compound II for use in Procedure A or B by subjecting said compound IX in which $R_3$ is halo in a Step 3 to an elimination reaction carried out similarly to Procedure C, as above-described.

The preparation of compound VIII by Step 1 involving reaction of a compound VI with a compound VII is a reaction of known type which may be conveniently carried out in an organic solvent medium at temperatures in the range of 40° C. to 200° C., more usually 60° C. to 150° C. Organic solvents providing an inert medium may be employed and include, by way of illustration, the aromatic solvents such as benzene and toluene, the chlorinated hydrocarbons such as methylene chloride and the dialkylamides such as dimethylacetamide. It is however usually convenient and preferred to employ an excess of the compound VII as the solvent medium. The reaction product of Formula VIII of Step 1 may be isolated as desired by working up in a known manner.

The cyclization of a compound VIII in Step 2 to obtain compound IX is preferably carried out in an organic solvent at controlled temperatures in the range of 0° C. to 30° C. The reaction of Step 2 is desirably carried out under anhydrous conditions employing a strong acid which is most conveniently hydrogen chloride or hydrogen bromide, preferably hydrogen chloride. Conventional solvents providing an inert reaction medium are suitably employed with the more convenient solvents being the lower alkanols such as ethanol. The product compound IX may be isolated from the reaction mixture of Step 2 by established procedures.

The conversion of a compound IX in which $R_3$ is halo to a compound II by Step 3 may be carried by the same reaction and under similar conditions as the above-described Procedure C, as previously mentioned.

The compounds VI employed as starting material in Step 1 are either known or may be prepared from available materials by established procedures described in the literature, for example, by A. Hirsch et al. Canadian J. Chem. 43, 2708 (1965).

Compounds of Formula I may form acid addition salts, and may be produced and isolated as such acid addition salts, as desired or required. It will be evident that pharmaceutically acceptable acid addition salts not materially affecting the pharmacological effect of compounds I are also within the scope of the present invention. Such pharmaceutically acceptable salts may include, by way of illustration, the hydrochloride, fumarate, maleate, formate, acetate, sulfonate and malonate. The acid addition salts of the subject compound I may be produced from the corresponding free bases by conventional procedures. Conversely, the free bases may be obtained from the salts by procedures known in the art.

The compounds of structural Formula I and their pharmaceutically acceptable acid addition salts are useful because they possess pharmacological activity in animals. In general, the compounds are useful as agents for the lowering of blood pressure, e.g. as hypotensive agents, as indicated by a lowering of blood pressure on intravenous administration to the anesthetized dog (5–30 mg./kg. dosage). For the above use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned use, the dosage administered will, of course, vary depending upon the compounds used and the mode of administration. However, in general, satisfactory results are obtained when administered at a daily dosage of from about .4 milligram to about 30 milligrams per kilogram of body weight, preferably given in divided doses 2 to 4 times a day, or in sustained release form. For most mammals the administration of from about 20 milligrams to about 150 milligrams of the compound per day provides satisfactory results and dosage forms suitable for internal administration comprise from about 5 milligrams to about 75 milligrams of the compound in admixture with a solid or liquid pharmaceutical carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredients: | Weight (mg.) |
| --- | --- |
| 6-allyloxy-imidazo(2,1-a)-phthalazine | 25 |
| Tragacanth | 10 |
| Lactose | 197.5 |
| Corn starch | 25 |
| Talcum | 15 |
| Magnesium stearate | 2.5 |

Preferred compounds from the standpoint of exhibiting hypotensive/anti-hypertensive activity are 6-allyloxy-imidazo(2,1 - a)phthalazine and 6 - cyclopropylamino-imidazo(2,1-a)phthalazine.

Various of the compounds of Formuula I exhibit one or more other pharmactological activities in animals and accordingly may be used as diuretic, lipolytic and analgesic agents. In particular, a number of the compounds of the invention as represented by those of Examples 1, 2, 3b and 3c exhibit diuretic activity as indicated by a determination of sodium and potassium using the Baird-Atomic flame photometer and the unanesthetized rat according to a modification of the method of Roy Aston, Toxicol. and Applied Pharmacology, 1; 277, 1959 (oral administration). For such use, satisfactory results are obtained in general at daily dosages in the range of 1 to 100 milligrams per kilogram of body weight with daily doses for large mammals in the range of 50 to 800 milligrams and individual dosages ranging from 10 to 400 milligrams. A preferred diuretic is represented by the compound which is 6-(2-phenethylamino)-imidazo-(2,1-a)phthalazine.

Compounds of the invention as reprsented by those of Examples 1, 2, 3a, 3b and 4 exhibit lipolytic activity as indicated by the determination of non-esterified fatty acids in sulfuric acid-heptane-isopropanol extracted plasma after administration interperitoneally to the rat, according to the method of Dole et al., J. Biol. Chem. 235, 2595, 1960. Dosages and dosage forms for such use are similar to those described for diuretic activity. A preferred lipolytic agent is represented by the compound which is 6 - dimethylaminoethylaminoimidazo(2,1 - a)phthalazine.

A compound exhibiting marked analgestic activity is 6-(4-methyl-1-piperazinyl)-imidazo(2,1-a)phthalazine, as indicated by the application of pressure to the yeast-inflamed foot of the rat(oral administration). The compound 6-ethoxy-imidazo(2,1-a)phthalazine exhibited analgesic activity in the Okun et al. modification of the Sigmund et al. "Writhing Method" as described in J. Pharmacol. & Exper. Therap. 139, 107 (1963). In general, daily dosages satisfactory for relieving pain in animals will range between 1 to 20 mg./kg. of body weight with daily dosages for large mammals being in the range of 70 to 400 milligrams and individual dosages ranging from 15 to 200 milligrams. Dosage forms and modes of administration are those conventionally in the make-up and administration of analgesics.

The compounds 6-cyclopropylamino-imidazo(2,1-a) phthalazine and 6 - p - chlorophenoxy - imidazo(2,1-a) phthalazine are indicated as anti-inflammatory agents by the Carrageenan test in rats and/or guinea pig skin lesion test. Daily dosages satisfactory for such use are 2 to 150 mg./kg. of body weight with daily dosages for large mammals being in the range of 140 to 2000 milligrams and individual dosages range from 35 to 1000 milligrams. Dosage forms and modes of administration are those conventionally employed in the make-up and administration of anti-inflammatory substances.

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

Imidazo(2,1-a)phthalazine

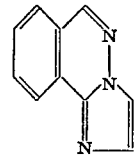

Step A: Preparation of N-(1-phthalazinyl)-aminoacetaldehyde dimethyl acetal

A mixture of 64 g. of 1-chlorophthalazine and 200 g. of aminoacetaldehyde dimethylacetal is refluxed for one hour. After cooling the reaction mixture is diluted with a large amount of ice water and the resulting partially crystalline precipitate is taken up in ethyl acetate. The aqueous phase is extracted with ethyl acetate and the combined organic phases are washed with water, dried over sodium sulfate and evaporated to dryness in vacuo. The residue is crystallized from ethylacetate to obtain N - (1 - phthalazinyl)aminoacetaldhyde dimethyl acetal, M.P. 145–148°.

Step B: Preparation of 2,3-dihydro-3-methoxy-imidazo-(2,1-a)phthalazine

A solution of 43 g. N-(1-phthalazinyl)-aminoacetaldehyde dimethyl acetal in 850 ml. absolute ethanol is cooled in an ice bath and anhydrous hydrogen chloride is introduced into the mixture for 30 min. The mixture is stirred at room temperature over night, and then most of the solvent is evaporated in vacuo. The residue is treated with 2 N sodium hydroxide solution, extracted with methylene chloride, the organic phase washed with water evaporated in vacuo to obtain a residue which is crystallized from petroleum ether(containing a small amount of diethyl ether) to obtain 2,3-dihydro-3-methoxy-imidazo(2,1 - a) phthalazine, M.P. 99–101° C.

Step C.—Preparation of imidazo(2,1-a)phthalazine

A mixture of 10.5 g. of 2,3-dihydro-3-methoxy-imidazo-(2,1-a) phthalazine and 900 mg. of p-toluene-sulfonic acid in 150 ml. toluene is refluxed for 16 hours. The solvent is evaporated in vacuo, the residue dissolved in methylene chloride, and the solution extracted first with 2 N sodium hydroxide solution and then with water. The organic phase is dried over sodium sulfate and evaporated in vacuo. The resulting residue is redissolved in methanol, treated with charcoal, filtered, concentrated and treated by addition of diethyl ether to crystallize imidazo(2,1-a)phthalazine, M.P. 102–105°. The material sublimes at 85° C. in high vacuum.

EXAMPLE 1a

Step A of Example 1 is repeated replacing aminoacetaldehyde dimethyl acetal with aminoacetaldehyde diethyl acetal to obtain on crystallization from ethyl acetate the compound which is N-(-phthalazinyl)-aminoacetaldehyde diethyl acetal, M.P. 119–122° C. The latter compound may be employed in repeating Step B of Example 1 to obtain from diethyl ether/petroleum ether (1:1) the compound which is 2,3 - dihydro - 3 - ethoxy-imidazo(2,1-a) phthalazine, M.P. 68–69° C.

EXAMPLE 2

6-(4-methyl-1-piperazinyl)-imidazo(2,1-a)phthalazine

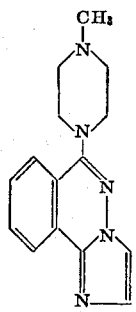

Step A.—Preparation of N-[1-(4-chloro-phthalazinyl)] aminoacetaldehyde dimethyl acetal A suspension of 7 g. of 1,4-dichlorophthalazine in 40 ml. aminoacetaldehyde dimethyl acetal is heated at 80° for four hours. The mixture is then poured on ice, extracted 3 times with methylene chloride, and the organic phase extracted with water (5 times) and twice with 2 N hydrochloric acid. This acid phase is made basic (cooling) with 2 N sodium hydroxide solution. The crystalline precipitate is formed, filtered off and washed with water. The wet crystalline material is dissolved in methylene chloride, dried over sodium sulfate and evaporated while adding diethyl ether to crystallized N-[1-(4-chloro-phthalazinyl)] aminoacetaldehyde dimethyl acetal, M.P. 144–146° C.

Step B.—Preparation of 6-chloro-2,3-dihydro-3-methoxy-imidazo(2,1-a)phthalazine

A suspension of 45 g. of N-(1-(4-chloro-phthalazinyl)-aminoacetaldehyde dimethyl acetal in 1 liter absolute ethanol is cooled in an ice bath and anhydrous hydrogen chloride gas is introduced for 45 min. The starting material goes first into solution. The resulting mixture is stirred overnight at room temperature. On concentration in vacuo and addition of almost an equal amount of diethyl ether there is crystallized out the hydrochloride of 6-chloro - 2,3-dihydro-3-methoxyimidazo(2,1-a)phthalazine, M.P. 275–78°. On concentration of the filtrate and addition of more diether ether one obtains an additional amount of the reaction product.

The base was freed according to standard procedures and crystallized from diethyl ether/petroleum ether to obtain 6 - chloro - 2,3-dihydro-3-methoxy-imidazo(2,1-a) phthalazine, M.P. 101° C.

Step C.—Preparation of 6-chloro-imidazo(2,1-a) phthalazine

To a suspension of 45 g. of the hydrochloride of 6-chloro - 2,3 - dihydro - 3-methoxy-imidazo(2,1-a)phthalazine in 500 ml. of absolute toluene is added 4.5 g. of p-toluenesulfonic acid. The resulting mixture is refluxed with stirring for 18 hours. The resulting precipitate is filtered off, washed with diethyl ether and dried in high vacuum at 90° C. for 2 hours to obtain the hydrochloride of 6-chloro-imidazo(2,1-a)phthalazine, M.P. 278° with decomposition. This crude hydrochloride is dissolved in water and the solution made basic with 2 N sodium hydroxide to obtain a crystalline precipitate which is filtered off, washed with water and dried by suction to obtain 6-chloro-imidazo(2,1-a)phthalazine, M.P. 103–105° C.

Step D.—Preparation of 6-(4-methyl-1-piperazinyl)-imidazo(2,1-a)phthalazine

A mixture of 8 g. of 6-chloroimidazo(2,1-a)phthalazine and 40 ml. N-methyl-piperazine is refluxed for 20 hours. The mixture is then evaporated to dryness, the resulting crystalline material filtered off, washed with water and dried by suction. The crude product is dissolved in methyl chloride, dried over sodium sulfate, filtered through a short column of aluminum oxide, treated with charcoal, and finally concentrated to a residue which is treated by addition of diethyl ether to obtain 6-(4-methyl-1-piperazinyl)-imidazo(2,1-a)phthalazine, M.P. 151–153° C.

EXAMPLE 3

Following the procedure of Step D of Example 2 and employing approximately equivalent amounts and the appropriate corresponding starting material of Formula III as above-indicated, various compounds I of the invention are obtained by reacting 6-chloroimidazo(2,1-a) phathalazine, as follows:

(a) With 2-dimethylaminoethylamine to obtain on crystallization from diethyl ether the compound I which is 6-dimethylaminoethylaminoimidazo(2,1-a)phthalazine, M.P. 82–87° C.

(b) With hydrazine (anhydrous) at room temperature for about 16 hours to obtain on crystallization from ethanol/chloroform (1:1) the compound I which is 6-hydrazino-imidazo(2,1-a) phthalazine, M.P. 293–295° C.

(c) With phenethylamine at 170° C. for 4 hours to obtain after chromatography using aluminum oxide the compound I which is 6-(2-phenethylamino)-imidazo(2,1-a)phthalazine, M.P. 128–129° C.

(d) With cyclopropylamine to obtain on crystallization from methylene chloride/diethyl ethyl (1:1) the compound I which is 6 - cyclopropylamino - imidazo(2,1-a) phthalazine, M.P. 166–168° C.

(e) With allylamine to obtain on crystallization from methylene chloride/diethyl ether (1:1) the compound I which is 6-allylamino-imidazo(2,1-a)phthalazine, M.P. 138–140° C.

(f) With dipropylamine to obtain on crystallization from petroleum ether the compound which is 6-dipropyl-amino-imidazo(2,1-a)phthalazine, M.P. 70° C.

(g) With ethanol amine to obtain from the reaction solvent consisting of ethanol amine the compound 6-(ω-hydroxyethylamino) - imidazo(2,1 - a)phthalazine, M.P. 226–229° C.

EXAMPLE 4

6-allyloxy-imidazo(2,1-a)phthalazine

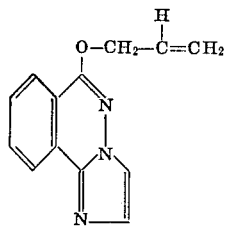

A solution of sodium allyloxide in allyl alcohol is prepared by dissolving 1.25 g. of sodium in 50 ml. allyl alcohol. To this solution 10 g. of 6-chloro-imidazo(2,1-a) phthalazine in 50 ml. allyl alcohol is added. The resulting solution is stirred at room temperature overnight, the solvent evaporated in vacuo, and the residue filtered through a column of silica gel using methylene chloride as the solvent. The filtrate is treated with diethyl ether to crystallize the product which is recrystallized from diethyl ether to obtain 6-allyloxy-imidazo(2,1-a)phthalazine, M.P. 84–86° C.

EXAMPLE 5

Following the procedure of Example 4 and employing approximately equivalent amounts and the appropriate corresponding starting material of Formula IV as above-indicated, the following compounds of the invention are prepared:

(a) 6-methoxy-imidazo(2,1-a)phthalazine, M.P. 106–108° C. (crystallization from diethyl ethyl/pentane (1:1)).

(b) 6 - (3 - dimethylaminopropoxy) - imidazo(2,1 - a) phthalazine, M.P. 64–66° C. (crystallization from diethyl ethyl/pentane (1:1)).

(c) 6-ethoxy-imidazo(2,1-a)phthalazine, M.P. 83–85° C. (from diethyl ether).

(d) 6 - p - chlorophenoxy - imidazo(2,1-a)phthalazine, M.P. 148–150° C. (from diethyl ether).

(e) 6-propargyloxy - imidazo(2,1-a)phthalazine, M.P. 199–200° C. (from chloroform).

What is claimed is:

1. A compound of the formula:

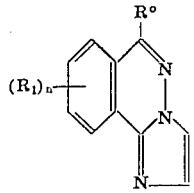

wherein
R° represents hydrogen, OR or

and
R represents alkyl of 1 to 6 carbon atoms; allyl; methylallyl; propargyl; di(lower of 1 to 3 carbon atoms) alkylamino(lower of 1 to 4 carbon atoms) alkyl; phenyl or phenyl substituted in the nucleus by 1 to 2 halogen atoms of atomic weight of from 19 to 80;
R' represents hydrogen, and
R" represents hydrogen; amino; alkyl of 1 to 5 carbon atoms; allyl; methylallyl; propargyl; di(lower of 1 to 3 carbon atoms) alkylamino(lower of 1 to 4 carbon atoms) alkyl; cycloalkyl of 3 to 6 carbon atoms; hydroxyalkyl of 2 to 6 carbon atoms; or phenalkyl wherein the alkyl is of 1 to 4 carbon atoms and the phenyl is unsubstituted or substituted by 1 to 2 halogen atoms of atomic weight of from 19 to 80; or
R' and R" together with the nitrogen attached to the ring represent di(lower of 1 to 5 carbon atoms)alkylamino; diallylamino; di(methylallyl)amino; or dipropargylamino; or
R' and R" together with the nitrogen attached to the tricyclic ring system form a 5 or 6 membered saturated heterocyclic group represented by

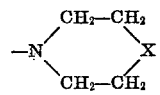

wherein
X is (a) a direct bond, (b) methylene, (c) oxygen or (d) N–$R_x$ wherein $R_x$ is hydrogen or alkyl of 1 to 3 carbon atoms;
$R_1$ represents halo of atomic weight of from 19 to 80, alkyl of 1 to 5 carbon atoms or alkoxy of 1 to 5 carbon atoms, and
$n$ is 0, 1 or 2, and when 2, then $R_1$ may be the same or different,
or a pharmaceutically acceptable acid addition salt thereof.

2. A compound of claim 1 in which R° is OR and R is propargyl.

3. A compound of claim 1 in which R° is OR and R is lower alkyl.

4. A compound of claim 1 in which R° is OR and R is di(lower)alkylamino(lower)alkyl.

5. A compound of claim 1 in which R° is OR and R is allyl.

6. The compound of claim 5 which is 6-allyloxy-imidazo(2,1-a)phthalazine.

7. A compound of claim 1 in which R° is NR'R".

8. A compound of claim 7 in which R' is hydrogen and R" is dimethylaminoethyl.

9. A compound according to claim 7 in which R' is hydrogen and R" is cycloalkyl.

10. The compound of claim 9 which is 6-cyclopropyl-amino-imidazo(2,1-a)phthalazine.

11. A compound of claim 7 in which R' is hydrogen and R" is lower hydroxyalkyl.

12. A compound of the formula:

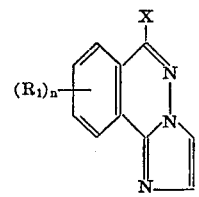

wherein $R_1$ and $n$ are as defined in claim 1 and X is chloro or bromo.

13. A compound of the formula:

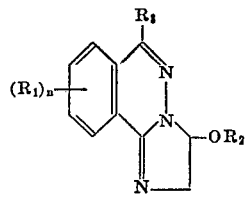

wherein $R_1$ and $n$ are as defined in claim 1, $R_2$ is lower alkyl and $R_3$ is from the group of hydrogen, chloro and bromo.

14. The process for preparation of a compound of claim 13 comprising reacting a compound of the formula:

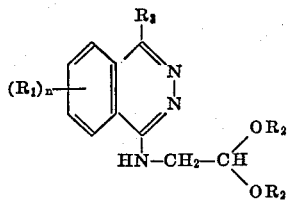

wherein $R_1$, $R_3$ and $n$ are as defined in claim 13 and $R_2$ is lower alkyl, with an acid under anhydrous conditions in an organic solvent at a temperature in the range of from 0° C. to 30° C.

References Cited

Castle et al., J. Hetero Chem., vol. 3, pp. 381–383 (1966).

NICHOLAS S. RIZZO, Primary Examiner

U.S. Cl. X.R.

424—250; 260—247.5 R